United States Patent
Desai et al.

(10) Patent No.: US 10,430,385 B1
(45) Date of Patent: Oct. 1, 2019

(54) LIMITED DEDUPLICATION SCOPE FOR DISTRIBUTED FILE SYSTEMS

(71) Applicant: EMC IP Holding Company LLC, Hopkinton, MA (US)

(72) Inventors: Rajiv Desai, Sunnyvale, CA (US); Niraj Tolia, Sunnyvale, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 508 days.

(21) Appl. No.: 15/199,599

(22) Filed: Jun. 30, 2016

Related U.S. Application Data

(63) Continuation-in-part of application No. 14/671,740, filed on Mar. 27, 2015.

(60) Provisional application No. 62/088,427, filed on Dec. 5, 2014.

(51) Int. Cl.
- *G06F 16/17* (2019.01)
- *G06F 16/174* (2019.01)
- *G06F 16/182* (2019.01)
- *G06F 16/23* (2019.01)

(52) U.S. Cl.
CPC ........ *G06F 16/1748* (2019.01); *G06F 16/182* (2019.01); *G06F 16/2365* (2019.01); *G06F 16/2379* (2019.01)

(58) Field of Classification Search
None
See application file for complete search history.

(56) References Cited

U.S. PATENT DOCUMENTS

| | | |
|---|---|---|
| 6,091,518 A | 7/2000 | Anabuki |
| 6,289,345 B1 * | 9/2001 | Yasue .................. G06F 17/50 707/999.01 |
| 6,324,492 B1 | 11/2001 | Rowe |
| 6,434,608 B1 | 8/2002 | Desal et al. |
| 6,434,609 B1 | 8/2002 | Humphrey |
| 6,467,048 B1 | 10/2002 | Olarig |
| 6,658,533 B1 | 12/2003 | Bogin |
| 6,959,339 B1 | 10/2005 | Wu |
| 7,590,803 B2 | 9/2009 | Wintergerst |
| 7,685,463 B1 | 3/2010 | Linnell |
| 8,260,913 B2 | 9/2012 | Knapp |
| 8,984,144 B2 | 3/2015 | Schapira |
| 9,280,683 B1 | 3/2016 | Echeverria |

(Continued)

OTHER PUBLICATIONS

Mark W. Storer et al, "Secure Data Deduplication", ACM 2008, 10 pages. (Year: 2008).*

(Continued)

*Primary Examiner* — Uyen T Le
(74) *Attorney, Agent, or Firm* — Workman Nydegger

(57) ABSTRACT

A method, article of manufacture, and apparatus for limited deduplication scope on a distributed file system is discussed. A write request is received from a client at the metadata server ("MDS"), where the write request comprises a data object identifier and a preferred object store identifier. The MDS determines whether a preferred object store associated with the preferred object store identifier contains a copy of a data object associated with the data object identifier. A write URL comprising the data object identifier and a object store location associated with the preferred object store is transmitted to the client when the preferred object store does not contain the copy of the data object.

12 Claims, 6 Drawing Sheets

(56) References Cited

U.S. PATENT DOCUMENTS

| | | | |
|---|---|---|---|
| 9,286,331 | B2 | 3/2016 | Knapp |
| 9,426,071 | B1 | 8/2016 | Caldejon |
| 9,898,477 | B1 | 2/2018 | Panghal |
| 10,021,212 | B1 | 7/2018 | Desai |
| 2002/0138559 | A1 | 9/2002 | Ulrich |
| 2003/0005084 | A1 | 1/2003 | Humphrey |
| 2004/0064485 | A1 | 4/2004 | Yoshida |
| 2004/0255048 | A1 | 12/2004 | Lev Ran et al. |
| 2005/0246393 | A1 | 11/2005 | Coates |
| 2005/0262150 | A1 | 11/2005 | Krishnaswamy |
| 2006/0036602 | A1 | 2/2006 | Unangst |
| 2006/0080511 | A1 | 4/2006 | Hoover |
| 2006/0200623 | A1 | 9/2006 | Gonzalez |
| 2006/0277196 | A1 | 12/2006 | Oosawa |
| 2007/0094354 | A1 | 4/2007 | Soltis |
| 2007/0168542 | A1 | 7/2007 | Gupta |
| 2007/0171562 | A1 | 7/2007 | Maejima |
| 2007/0174333 | A1 | 7/2007 | Lee |
| 2007/0179981 | A1 | 8/2007 | Vincent |
| 2007/0237086 | A1 | 10/2007 | Tulac |
| 2008/0195483 | A1 | 8/2008 | Moore |
| 2009/0083494 | A1 | 3/2009 | Bhanoo |
| 2010/0042743 | A1 | 2/2010 | Jeon |
| 2010/0161657 | A1* | 6/2010 | Cha .................. G06F 11/2041 707/770 |
| 2010/0293336 | A1 | 11/2010 | Shribman |
| 2010/0299447 | A1 | 11/2010 | Salvi |
| 2010/0332401 | A1* | 12/2010 | Prahlad ............. G06F 17/30082 705/80 |
| 2010/0332456 | A1 | 12/2010 | Prahiad |
| 2011/0145189 | A1 | 6/2011 | Zheng et al. |
| 2011/0258461 | A1 | 10/2011 | Bates |
| 2012/0054152 | A1 | 3/2012 | Adkins |
| 2012/0151016 | A1 | 6/2012 | Wein |
| 2012/0226770 | A1 | 9/2012 | Schapira |
| 2012/0254116 | A1 | 10/2012 | Thereska |
| 2012/0311248 | A1 | 12/2012 | Goodman |
| 2013/0041872 | A1* | 2/2013 | Aizman ............... G06F 16/182 707/690 |
| 2013/0060884 | A1 | 3/2013 | Bernbo |
| 2013/0110906 | A1 | 5/2013 | Zearing |
| 2013/0226888 | A1 | 8/2013 | Govind |
| 2013/0238752 | A1 | 9/2013 | Park et al. |
| 2013/0290284 | A1 | 10/2013 | Knapp |
| 2014/0039818 | A1 | 2/2014 | Arya |
| 2014/0040412 | A1 | 2/2014 | Yanagihara |
| 2014/0165119 | A1 | 6/2014 | Liu |
| 2014/0189432 | A1 | 7/2014 | Gokhale |
| 2015/0161048 | A1 | 6/2015 | Patil et al. |
| 2015/0180968 | A1 | 6/2015 | Schapira |
| 2015/0249709 | A1 | 9/2015 | Teng et al. |
| 2015/0277802 | A1 | 10/2015 | Oikarinen |
| 2015/0280959 | A1 | 10/2015 | Vincent |
| 2015/0350106 | A1 | 12/2015 | Whalley |
| 2016/0011816 | A1 | 1/2016 | Aizman |
| 2016/0092354 | A1 | 3/2016 | Steely |
| 2016/0239397 | A1 | 8/2016 | Thomas |
| 2016/0269501 | A1 | 9/2016 | Usgaonkar |
| 2016/0292429 | A1 | 10/2016 | Manville et al. |
| 2016/0337426 | A1 | 11/2016 | Shribman |
| 2016/0357450 | A1 | 12/2016 | Rao et al. |
| 2016/0364407 | A1 | 12/2016 | Hong |
| 2017/0004082 | A1 | 1/2017 | Sehgal |

OTHER PUBLICATIONS

U.S. Appl. No. 14/671,675, filed Mar. 27, 2015, Rajiv Desai.
U.S. Appl. No. 14/673,071, filed Mar. 30, 2015, Rajiv Desai, et al.
U.S. Appl. No. 14/864,399, filed Sep. 24, 2015, Vijay Panghal.
U.S. Appl. No. 14/864,425, filed Sep. 24, 2015, Vijay Panghal.
U.S. Appl. No. 14/865,333, filed Sep. 25, 2015, Vijay Panghal, et al.
U.S. Appl. No. 14/978,424, filed Dec. 22, 2015, Vijay Panghal, et al.
U.S. Appl. No. 14/978,480, filed Dec. 22, 2015, Vijay Panghal, et al.
U.S. Appl. No. 14/978,520, filed Dec. 22, 2015, Vijay Panghal, et al.
U.S. Appl. No. 15/199,617, filed Jun. 30, 2016, Rajiv Desai, et al.
U.S. Appl. No. 15/199,624, filed Jun. 30, 2016, Rajiv Desai, et al.
U.S. Appl. No. 15/388,805, filed Dec. 22, 2016, Shrinand Javadekar, et al.
U.S. Appl. No. 16/031,775, filed Jul. 10, 2018, Rajiv Desai.

* cited by examiner

LIMITED DEDUPLICATION SCOPE FOR DISTRIBUTED FILE SYSTEMS

CROSS REFERENCE TO RELATED APPLICATIONS

This application is a continuation in part and claims priority to U.S. patent application Ser. No. 14/671,740, filed Mar. 27, 2015, which is incorporated herein by reference for all purposes.

FIELD OF THE INVENTION

This invention relates generally to distributed file systems, and more particularly to systems and methods for providing distributed file systems in multi-cloud environments.

BACKGROUND OF THE INVENTION

Distributed file systems manage files and folders spread across multiple computers. They may serve a similar function as traditional file systems, but are designed to provide file/folder storage and controlled access over local and wide area networks.

Cloud providers may offer scalable object stores for storing data. Individuals and business may be presented with multiple cloud provider options for storing their data.

There is a need, therefore, for an improved method, article of manufacture, and apparatus for providing a distributed file system in a multi-cloud environment.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
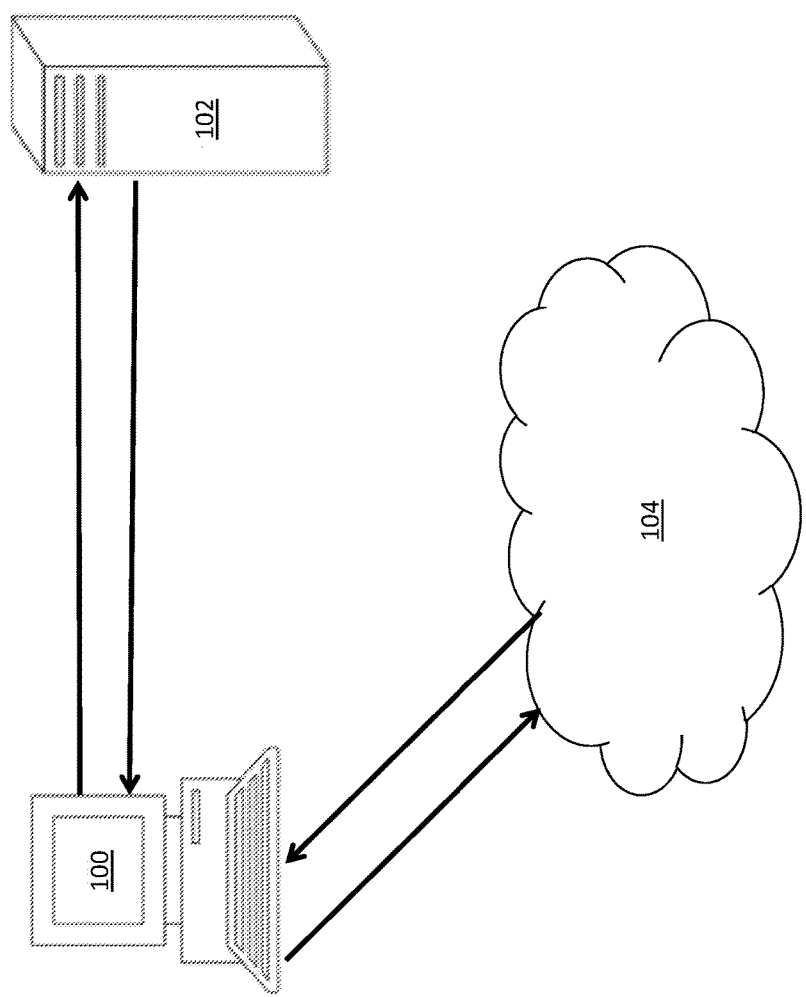
FIG. 1 depicts a system architecture for a distributed file system in a cloud environment consistent with an embodiment of the present disclosure

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Embodiments of the present disclosure address a distributed file system operating on a multi-cloud environment. Distributed files systems may be used to manage files, folders, and other data spread across multiple computing systems. They may be presented to users, applications, or other clients as traditional file systems, but may actually provide access to data over local and wide area networks. For example, the data could be stored in a cloud based object stores, such as Amazon's AWS S3, Microsoft Azure, Google Cloud Storage, a private object store, and/or a hybrid object store. Access to the data on these object stores may be managed by a metadata server, which could be a local or remote server from the client.

Given the availability of multiple public, private, and hybrid object stores, different clients may have preferred object stores for storing the data on the distributed file system. For example, a client may have a lower latency, higher bandwidth connection to one object store versus another object store. That client may prefer to read and write data from the object store with the better connection to optimize performance. Additionally or alternatively, a client may prefer a particular object store to comply with legal or other regulations. A client in the European Union, for example, may be required to store data in an object store physically located in a member nation. The systems, methods, and processes discussed herein enable different clients to have preferred object stores within a distributed file system.

FIG. 1 depicts a system implementing a distributed file system in a cloud environment. The system of FIG. 1 may include client 100, metadata server ("MDS") 102, and object store 104. While only one client 100 is shown, the system may include multiple clients accessing the distributed file system. Similarly, the system may include multiple object stores 104 and/or multiple MDS 102.

Client 100 may be any general purpose computing device. For example, client 100 may be a personal computer, workstation, handheld computer, smart phone, and/or tablet computer. Additionally or alternatively, client 100 may be a software module or application running on a general purpose computing device. Client 100 may be in communication with a MDS 102 and object store 104 over a network connection, such as a local area network ("LAN") or wide are network ("WAN"), or via any other form of communication. Client computer 100 may interact with the distributed file system as it would with a traditional file system, such as by writing data to and reading data from the distributed file system.

MDS 102 may be a general purpose computing device managing distributed file system metadata. This metadata could include, for example, the location of data stored in the distributed file system. MDS 102 may be a physical or a virtual machine, and may operate in an environment local to or remote from client 100. For example, MDS 102 may be a virtual machine operating in the same datacenter as client 100. Alternatively, MDS 102 may operate in a third party cloud environment, such as Amazon Web Services ("AWS"). In some embodiments, MDS 102 may operate in the same third party cloud environment as object store 104.

Object store 104 may comprise a storage location for storing data in the distributed file system. Object store 104 may be a private, public, or hybrid cloud environment capable of storing data. A private cloud may be an object store only available to clients belonging to a particular enterprise. For example, a private cloud may be a Microsoft Azure install operating in a datacenter completely under the control of an enterprise. The install, including the associated data and services, may not be accessible to anyone outside of the enterprise. A public cloud may be any object store accessible to the public that requires authentication to access certain data. For example, Amazon S3 is available to members of the public but data stored in the object store is only accessible by authorized clients. A hybrid cloud may be a combination of a private and public cloud, such that some data is stored in the private cloud and other data is stored in the public cloud.

In some embodiments, client 100 may transmit communications to and receive responses from MDS 102. Similarly, client 100 may transmit communications to and receive responses from object store 104. Typically these communications will be IO requests and responses, such as read/write communications, though any other time of communication is consistent with the present disclosure.

For example, client 100 may decide to read data from the distributed file system. Client 100 may first mount the distributed file system by transmitting a mount request and/or intent to MDS 102. Similarly, if the distributed file system has already been mounted, client 100 may transmit a change location/directory request to MDS 102. In response, MDS 102 may consult a metadata table to determine data objects located at the root of the mount or in the new location, and transmit information related to the data back to client 100. This data could be, for example, a list of files and/or directories located at the root or new location. The data may also include a unique identifier for each data object, such as a hash and/or path of the object.

Once client 100 has a list of files and/or directories, client 100 may select a data object to read. Client 100 may transmit a read request identifying the desired data object back to MDS 102. In some embodiments, this read request may include a path or hash identifier for the data object the client desires. Once MDS 102 receives the request, it may attempt to locate the data object on the distributed file system.

In an embodiment, MDS 102 maintains location data for all of the data objects in the distributed file system. This location data may be maintained with other data object metadata in a database on MDS 102. For example, the database may comprise a table mapping a data object to one or more object store locations. These object store locations could reside, for example, on object store 104.

In response to the read request received from client 100, MDS 102 may consult the database table to determine the object location. MDS 102 may then return the object location back to client 100. In an embodiment, the object location returned might be a URL the client may use to access all or part of the data object. For example, the URL may comprise "http://<object store domain>/<container identifier>/<object identifier>", where <object store domain> is the domain of the object store, <container identifier> is an identifier for the distributed file system, and <object identifier> identifies the object to be read. In an embodiment, the object identifier is a hash of the object and/or a hash of a version of the object.

Client 100 may attempt to access the data object once it receives the data object location from MDS 102. If the data object location is a URL, the client may issue an HTTP GET to the URL. For example, the client may issue a GET to object store 104 and/or the cloud service provider holding the data object. In response, object store 104 may return the requested data object to client 100.

The present system may also be used to write data objects to the distributed file system. This process may be similar to reading data objects, as discussed above. Once the distributed file system is mounted and client 100 has identified the file system location where it wishes to write the data, client 100 may transmit a write intent to MDS 102. This write intent may include the identified file system location and an object identifier for the data object client 100 intends to write. In some embodiments, this object identifier may be a hash of the data object.

Upon receiving the intent, MDS 102 may consult a database table to determine if the data object has already been placed in an object store, such as object store 104. If the data object already exists, there is no need to write it to the object store a second time. MDS 102 may perform this check by comparing the provided object identifier to all of the object identifiers in the table. If there is a match, the data object exists. If there is not a match, the data object does not exist.

If the data object already exists in object store 104, client 100 may not need to transmit the data object to the store a second time. Instead, MDS 102 may create a new entry in the table comprising the object identifier and the location client 100 wishes to write the data. MDS 102 may then transmit a write complete notification to client 100, and the write process may terminate. Should client 100 issue a subsequent read for the object, MDS 102 may provide a URL to the data object on object 104 as discussed above. This process provides an inherent form of data deduplication by ensuring a data object is not written to the same object store multiple times.

If MDS 102 determines object store 104 does not have a copy of the data object (i.e. the object identifier is not found in the table), it may create a new entry for the object as discussed above. MDS 102 may additionally provide an object location back to client 100, and associate this object location with the new table entry. In some embodiments the object location is a URL constructed in the same manner as the URL generated during the read process.

Once client 100 receives the object location it may write the data object to that location. If the object location is a URL identifying an object store, such as object store 104, client 100 may write the data to that location using an HTTP POST or PUT. The POST request may include the data object client 100 wishes to store on object store 104. Client 100 may wait for a confirmation from object store 104 before determining the write was successful.

While the above examples discuss reading and writing data objects as individuals, other configurations may exist. For example, individual data objects may be broken into a set of data chunks. Each of these data chunks may be stored and accessed on the object store in the same manner as the individual data objects discussed above. When a client wishes to read a data object, the client may submit identifiers for all the data object's constituent chunks to the MDS and receive a URL for each. Similarly, for writes the client may submit identifiers for all the data object's constituent chunks to the MDS. In response, the MDS may only provide write URLs for the chunks that do not already exist on the object store. If the chunks already exist the MDS may simply update the metadata table; there is no need to write the chunks a second time.

Figure 2:
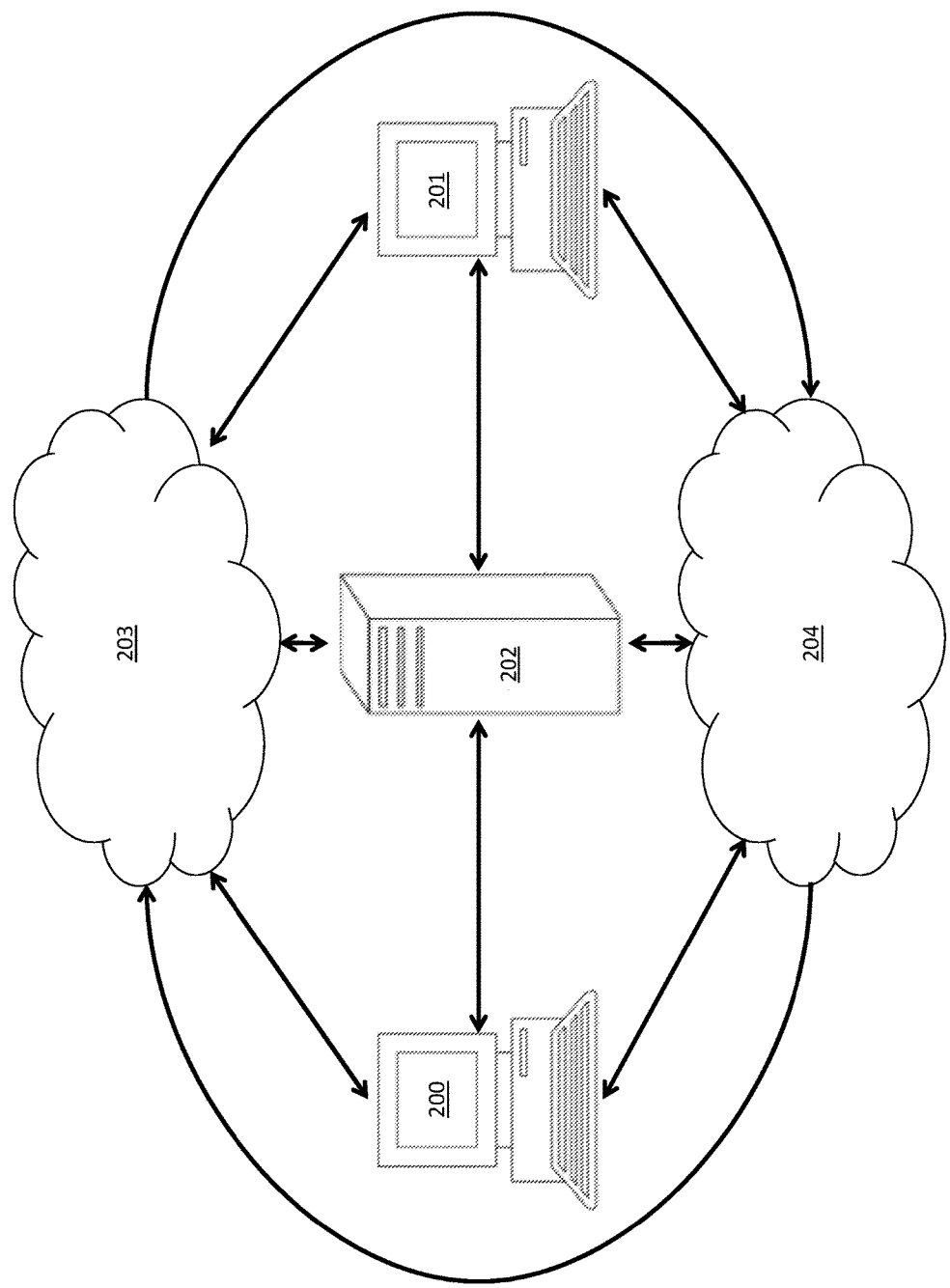
FIG. 2 depicts a system architecture for a distributed file system in a multi-cloud environment consistent with an embodiment of the present disclosure

Turning now to FIG. 2, a system for providing a distributed file system in a multi-cloud environment is discussed. The multi-cloud environment may be similar to the system discussed with reference to FIG. 1, and in an embodiment may include clients 200, 201, metadata server 202, and object stores 203, 204. Clients 200, 201 may be substantially similar to client 100 discussed in FIG. 1. MDS 202 may be similar to MDS 102 discussed in reference to FIG. 1. Finally, object stores 203, 204 may be similar to object store 104 discussed in reference to FIG. 1.

The system of FIG. 2 differs from FIG. 1 in that it provides multiple object store options to clients 200, 201. Specifically, clients 200, 201 may be in communication with both object store 203 and object store 204. In some embodiments, a client may have a preferred object store. This could be due, for example, to a superior connection between the client and the preferred object store. MDS 202 may help each client identify its preferred object store, and may govern the read and write requests to the store.

For example, client 200 may attempt to access the distributed file system. Client 200 may be new to the system, and/or its preferred object store may have expired (as discussed below). Once client 200 mounts the distributed file system, it may request a list of all object stores and their locations from MDS 202. MDS 202 may provide this list of object store locations, which may be URLs.

After client 200 receives the list of object store locations it may ping or issue a GET to each object store on the list. In some embodiments, a data object may be placed on the object store when it is first accessed by a MDS. The MDS could, for example, issue a PUT containing this data object to the object store. The client may thereafter issue a GET to the object store for this data object. For example, client 200 may receive a list comprising a URL for object store 203 and object store 204. Once the client has received the list, it may issue an HTTP GET request to both of the object stores for the data object that was placed on them by the MDS. In an embodiment, client 200 may time the responses from each of the object stores, and may determine the object store with the shortest response time is the preferred object store.

Figure 3:
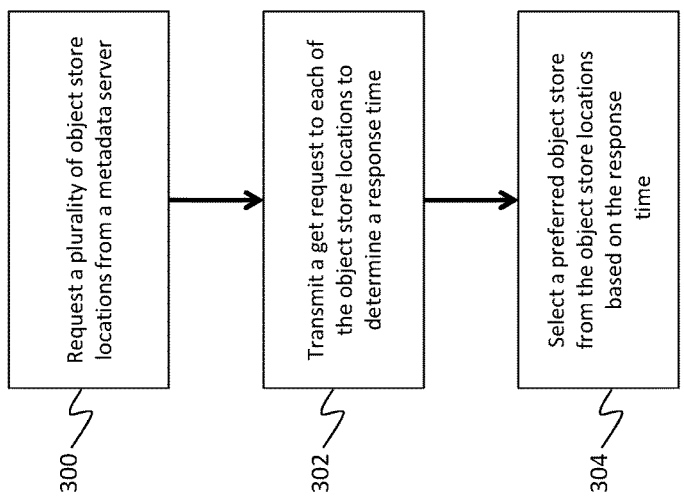
FIG. 3 depicts a process for selecting a preferred object store consistent with an embodiment of the present disclosure

FIG. 3 depicts a flowchart for determining a preferred object store consistent with an embodiment of the present disclosure. At block 300, a client may request a plurality of object store locations from a MDS. In an embodiment, the MDS may store location information associated with data objects, and may also store object store locations associated with specific object stores. These object store locations may comprise URLs for the object stores. In response to the client's request, the MDS may transmit these object store locations back to the client.

At block 302, the client may ping each of the object store locations to determine a response time. For example, the client may issue an HTTP GET request to each of the object store locations and wait for a response.

Finally, at block 304 the client may select a preferred object store based on the response times. In one embodiment the client may pick the object store with the shortest response time as the preferred object store. In some embodiments, the client may rank multiple object stores in order of preference based on the response times. This may be beneficial if the client's first preference is unavailable for read and/or write operations. The client may store the preferred object store or stores locally for future read and/or write operations.

In some embodiments, a client's preferred object store may be associated with a time-to-live. The preferred object store may periodically expire, requiring the client to repeat the process of FIG. 3 to reselect a preferred object store, which may be the same preferred object store selected the last time the process ran. This enables clients to select new object stores added to the system since the last time a preferred store was set, or to select a different preferred object store if the connection between the client and that store has improved.

Figure 4:
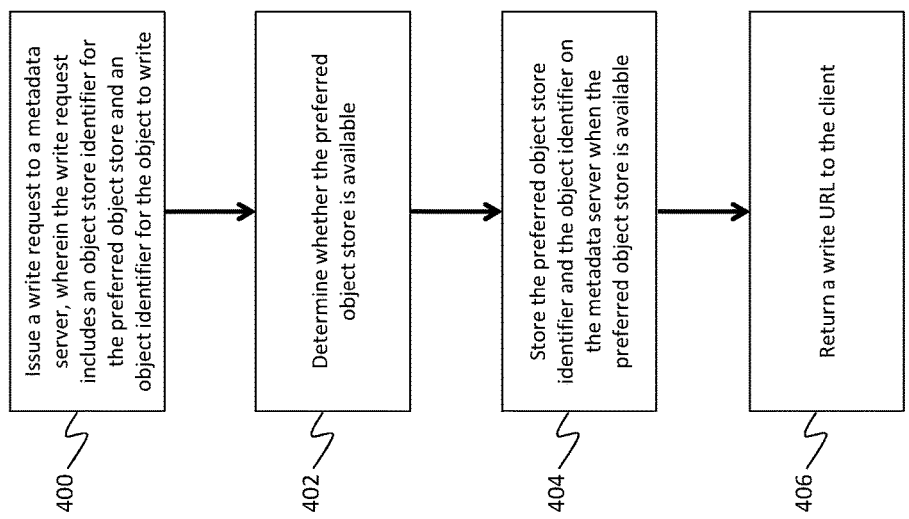
FIG. 4 depicts a process for writing a data object to a preferred object store consistent with an embodiment of the present disclosure.

Turning now to FIG. 4, a process for writing data to a preferred object store in a system similar to that shown in FIG. 2 is discussed. The write process may be substantially similar to that discussed in reference to FIG. 1, and may take a client's preferred object store into consideration.

At block 400, a client may issue a write request to a MDS. This client could be, for example, client 200 and the MDS may be MDS 202. The write request may include an object identifier for the data object the client wishes to write. For example, the write request may include a hash of the data object. Additionally, the write request may include an object store identifier for the preferred object store. This object store identifier may be any piece of information capable of uniquely identifying the preferred object store, and in an embodiment is the object store's domain. Additionally or alternatively, the client may provide a ranked list of preferred object store locations to the MDS.

At 402, the MDS may determine if the preferred object store is available for write operations. Pinging the preferred object store from the MDS could make this check. For example, if the client's preferred object store is object store 203, MDS 202 may determine whether object store 203 is available by issuing an HTTP GET request and waiting for a response. If the object store is available it will be used to accommodate the clients write.

If the object store is not available, the MDS may attempt to find a suitable alternative. For example, object store 204 may be designated a default object store. If the client's preferred object store is not available, the MDS may automatically direct all writes to that object store. Additionally or alternatively, the MDS may iterate through a client's ranked list of preferred object stores. The MDS may attempt to access the first preference, followed by the second preference, and so on until an available object store is found.

In some embodiments, the client may provide the preferred object store to the MDS every time it makes a write request. Additionally or alternatively, the MDS may store each client's preferred object store locally. This locally stored preference may be associated with time-to-live, and may periodically expire. In such an embodiment the client may need to periodically update the MDS with its preferred object store.

At block 404, a mapping may be made on the MDS between the object store location and the object the client wishes to store at that location. For example, the MDS may update a metadata table to associate the object store identifier with the object identifier. This may allow future read operations to know which object store contains the data object.

Finally, at block 406, MDS may return a write URL to the client. This write URL may enable the client to write the data object to the object store, and may be substantially similar to the write URLs discussed above.

Figure 5:
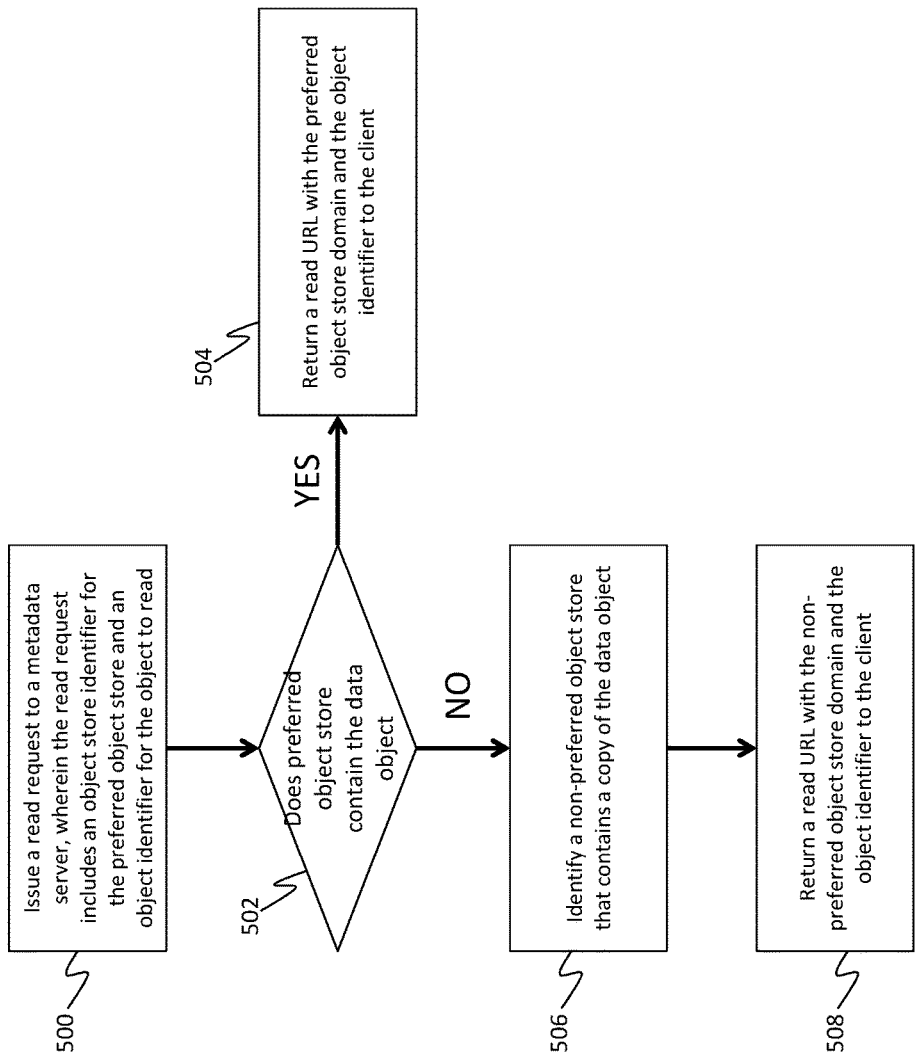
FIG. 5 depicts a process for reading data from an object store consistent with an embodiment of the present disclosure.

Turning now for FIG. 5, a process for reading a data object from a preferred object store is discussed. This process could operate on a distributed file system in a multi-cloud environment, such as the environment depicted in FIG. 2. In some embodiments, this read process may be similar to that discussed in reference to FIG. 1.

At block 500 a client, such as client 200, may issue a read request to a metadata server, such as MDS 204. In some embodiments the read request may include an object store identifier and an object identifier. The object store identifier may be a unique identifier, such as a domain, of the client's preferred object store. This preferred object store may have been selected as part of a process similar to that discussed in reference to FIG. 3. For example, the preferred object store may be object store 203. In some embodiments, the client may provide a ranked list of preferred object stores to the MDS. The object identifier may be a unique identifier for the object the client would like to read, and in some embodiments may be a hash of the object.

At block 502, a check is made to determine whether the preferred object store contains the data object. In an embodiment, the MDS makes this determination. This check could be made, for example, by consulting a metadata table mapping objects to object stores. If there is a mapping between the object and the preferred object store in the metadata table, the MDS may conclude that the preferred object store does contain a copy of the object. If there is not a mapping between the object and the preferred object store, the MDS may conclude that the preferred object store does not contain a copy of the object.

If the preferred object store contains a copy of the data object, the process may continue to block 504. At block 504, a read URL may be returned to the client. This read URL may include the preferred object store's domain, and may also include the object identifier. In some embodiments, the read URL may be substantially similar to the read URL discussed above in reference to FIG. 1.

If the preferred object store does not contain a copy of the data object, the process may continue to block 506. At block 506 the MDS may attempt to identify a non-preferred object store that contains a copy of the data object. If the client provided a ranked list of preferred object stores, the MDS may iterate through the list to determine if a next preferred object store contains a copy of the data object. If the client did not provide a ranked list of preferred object stores, the MDS may identify any object store in the metadata table that contains the data object and designate that object store as the non-preferred object store.

Once a non-preferred object store is identified, the read URL may be returned from the MDS to the client at block 508. This read URL may include the domain for the object store in addition to the object identifier. In some embodiments, the read URL may be substantially similar to the read URL discussed above.

In some embodiments data objects may be replicated between object stores after a client has written the object to the preferred object store. For example, a data object may be replicated from object store 203 to object store 204. This may expedite read processes when clients have different preferred object stores. For example, client 200 may prefer object store 203 and write a data object to that store. Client 201, however, may prefer object store 204 for read operations. Replicating the data from object store 203 to object store 204 therefore allows each client to use their preferred object store.

Replicating data between object stores may require the MDS to update its metadata table to track the object. If the data object were simply transferred from one object store to another, the MDS would be unable direct client read requests to the data object. In some embodiments the MDS may initiate the replication process and update its metadata table as the data objects are transferred. Additionally or alternatively, the replication process may be substantially similar to the write process with the object store holding the data object acting as the client. For example, if the data object is stored in object store 203 and needs to be replicated to metadata store 204, metadata store 203 may operate as a client making a write to metadata store 204 via MDS 202. This write process may be similar to those discussed above, and will therefore ensure the metadata table in MDS 202 is updated appropriately.

Figure 6:
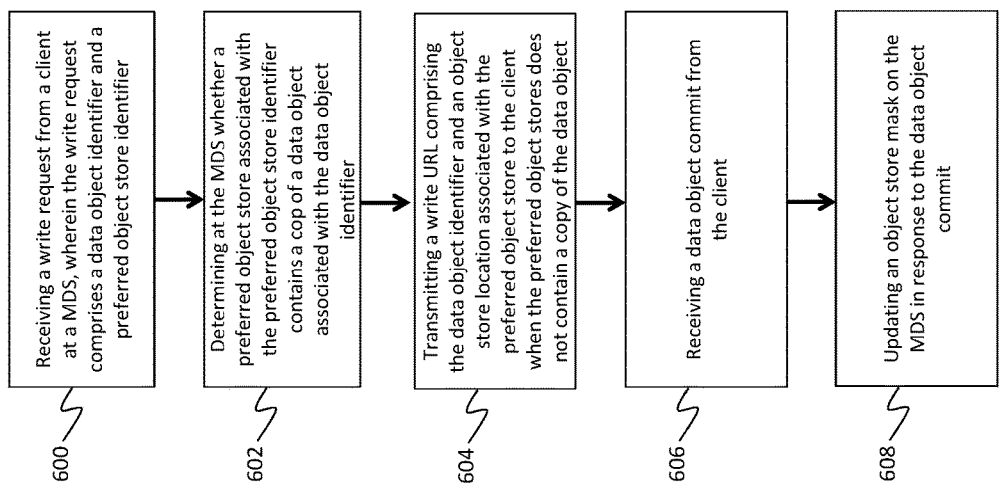
FIG. 6 depicts a process for providing limited deduplication scope on a distributed file system consistent with an embodiment of the present disclosure.

Turning now to FIG. 6, a process for deduplicating data on a single object store in conjunction with a write request is discussed. In some embodiments, the distributed file system may comprise global deduplication functionality as discussed in co-pending U.S. patent application Ser. No. 15/080,437. Global deduplication may be beneficial for reducing the number of redundant data objects in a distributed file system, but may come with performance costs. For example, if a client attempts to read a data object from their preferred object store, and the data object only exists on a different store due to deduplication, the client may be forced to read the data object from the non-preferred alternative object store. The store may be further away from the client, or have other latency and/or bandwidth constraints that will hinder read performance.

The process of FIG. 6 provides local deduplication to address these concerns. Unlike global deduplication, which may only store data objects a number of times equal to a replication factor among the stores, local deduplication is limited in scope to a particular store. For example, if the a global replication factor is two, and a data object is already stored on two object stores, the process will nevertheless store a third copy on the local store.

At block 600, a write request may be received from a client at a MDS server. This write request may be substantially similar to that discussed above, and may comprise a data object identifier and one or more preferred object store identifiers. In an embodiment, the preferred object store identifier may be the object store the client wishes to write the data object to.

At 602, the MDS may determine whether the preferred object store contains a copy of the data object associated with the identifier. If the object store already contains a copy, the MDS may update local metadata, transmit a write complete to the client, and the process may terminate. If preferred object store does not contain a copy of the data object, the process may continue to block 604, even if the data object is already stored on a different object store in the distributed file system.

At 604, a write URL may be transmitted from the MDS to the client. This write URL may include the data object identifier and the object store location for the preferred object store. In some embodiments, this URL is only transmitted when the preferred object store does not contain a copy of the data object. Once the client receives the URL, it may proceed with the data object write as discussed above.

At 606, the MDS may receive a data object commit from the client. The data object commit may be transmitted after the client has successfully stored the data object to the object store.

In some embodiments, at 608 the MDS may update an object store bit mask in response to the commit. The object store bit mask may comprise a bit for each object store in the distributed file system, and one bit mask may be associated with each data object identifier. When a data object is stored in a particular object store, the bit associated with that store may be set to 1. This may enable the MDS to quickly determine whether a given object store contains a copy of a data object in the determination action of block 602. When making the determination, the MDS may check the bit for the preferred object store. If the bit is 1, the object store contains a copy of the data object. If the bit is 0, the object store does not contain a copy of the data object.

While the present disclosure discusses local deduplication, some embodiments may include both local and global deduplication. In some embodiments, the scope of deduplication may be based on policy. For example, certain file extensions, location, or client preferences may have one form of deduplication as opposed to the other.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for limited deduplication scope on a distributed file system ("DFS") in a system that includes a plurality of object stores, the method comprising:
    receiving a write request from a client at the metadata server ("MDS"), wherein the write request comprises a data object identifier and a preferred object store identifier;
    determining at the MDS whether a preferred object store associated with the preferred object store identifier contains a copy of a data object associated with the data object identifier, wherein the MDS is separate from the preferred object store; and
    transmitting a write URL comprising the data object identifier and an object store location associated with the preferred object store to the client when the preferred object store does not contain the copy of the data object, wherein the client writes the data object to the preferred object store using the write URL, wherein communications between the client and the MDS are independent and separate from communications between the client and the preferred object store.

2. The method of claim 1, further comprising receiving a data object commit from the client.

3. The method of claim 2, further comprising updating an object store mask on the MDS in response to the data object commit.

4. The method of claim 1, wherein the data object is stored on a second object store within the DFS, wherein the second object store is not the preferred object store.

5. A computer program product for limited deduplication scope on a distributed file system ("DFS") in a system that includes a plurality of object stores, the computer program product comprising a non-transitory computer readable medium encoded with computer executable program, the code enabling:
    receiving a write request from a client at the metadata server ("MDS"), wherein the write request comprises a data object identifier and a preferred object store identifier;
    determining at the MDS whether a preferred object store associated with the preferred object store identifier contains a copy of a data object associated with the data object identifier, wherein the MDS is separate from the preferred object store; and
    transmitting a write URL comprising the data object identifier and an object store location associated with the preferred object store to the client when the preferred object store does not contain the copy of the data object, wherein the client writes the data object to the preferred object store using the write URL, wherein communications between the client and the MDS are independent and separate from communications between the client and the preferred object store.

6. The computer program product of claim 5, further comprising receiving a data object commit from the client.

7. The computer program product of claim 6, further comprising updating an object store mask on the MDS in response to the data object commit.

8. The computer program product of claim 5, wherein the data object is stored on a second object store within the DFS, wherein the second object store is not the preferred object store.

9. A system for limited deduplication scope on a distributed file system ("DFS") in a system that includes a plurality of object stores, the system comprising a computer processor configured to execute instructions comprising:

receiving a write request from a client at the metadata server ("MDS"), wherein the write request comprises a data object identifier and a preferred object store identifier;

determining at the MDS whether a preferred object store associated with the preferred object store identifier contains a copy of a data object associated with the data object identifier, wherein the MDS is separate from the preferred object store; and transmitting a write URL comprising the data object identifier and an object store location associated with the preferred object store to the client when the preferred object store does not contain the copy of the data object, wherein the client writes the data object to the preferred object store using the write URL, wherein communications between the client and the MDS are independent and separate from communications between the client and the preferred object store.

10. The computer program product of claim 9, further comprising receiving a data object commit from the client.

11. The computer program product of claim 10, further comprising updating an object store mask on the MDS in response to the data object commit.

12. The computer program product of claim 9, wherein the data object is stored on a second object store within the DFS, wherein the second object store is not the preferred object store.

* * * * *